(12) United States Patent
Leffer et al.

(10) Patent No.: US 10,113,619 B2
(45) Date of Patent: Oct. 30, 2018

(54) LOCKING DEVICE AND LOCKING METHOD FOR THE TOOL HOLDER OF A DRILLING SYSTEM

(71) Applicant: Stahl- und Apparatebau Hans Leffer GmbH & Co. KG, Saarbrücken (DE)

(72) Inventors: Michael Leffer, Blieskastel (DE); Ewald Schmitt, Epping (FR)

(73) Assignee: Stahl- und Apparatebau Hans Leffer GmbH & Co. KG, Saarbrücken (DE)

( * ) Notice: Subject to any disclaimer, the term of this patent is extended or adjusted under 35 U.S.C. 154(b) by 240 days.

(21) Appl. No.: 15/102,099

(22) PCT Filed: Dec. 3, 2014

(86) PCT No.: PCT/EP2014/003212
§ 371 (c)(1),
(2) Date: Jun. 6, 2016

(87) PCT Pub. No.: WO2015/086126
PCT Pub. Date: Jun. 18, 2015

(65) Prior Publication Data
US 2016/0305515 A1  Oct. 20, 2016

(30) Foreign Application Priority Data

Dec. 9, 2013  (DE) .......................... 10 2013 020 761

(51) Int. Cl.
*E21B 41/00* (2006.01)
*F16H 19/00* (2006.01)
(Continued)

(52) U.S. Cl.
CPC ........... *F16H 19/001* (2013.01); *E21B 17/03* (2013.01); *E21B 41/00* (2013.01); *E21B 3/02* (2013.01); *F16H 2019/008* (2013.01)

(58) Field of Classification Search
CPC ........ E21B 17/03; E21B 17/046; E21B 19/16; E21B 33/03; E21B 3/02; E21B 41/00;
(Continued)

(56) References Cited

U.S. PATENT DOCUMENTS 3,345,087 A * 10/1967 Hanes ..................... A01K 63/04
285/321
5,333,911 A * 8/1994 Watkins ................ E21B 17/046
285/18
(Continued)

FOREIGN PATENT DOCUMENTS

CH         675747 A5 * 10/1990 ............... E21B 3/02
DE      3721448 A1 *  1/1989 ............... E21B 7/20
(Continued)

OTHER PUBLICATIONS

International Preliminary Examination Report dated Mar. 23, 2016 in International Application No. PCT/EP2014/003212.
(Continued)

*Primary Examiner* — Daniel P Stephenson
(74) *Attorney, Agent, or Firm* — Panitch Schwarze Belisario & Nadel LLP

(57) ABSTRACT

A locking device and a locking method are provided for a tool holder of a rotary drilling rig. The locking device includes a sleeve, a locking pin, a movement system, and a control system. The sleeve and the locking pin are configured such that the sleeve engages around the locking pin with a form fit, such that the locking pin can be rotated in the sleeve about the longitudinal axis of the locking pin. As a result, the locking pin can be displaced laterally parallel to the longitudinal axis. The movement system has at least one electric motor and at least one shaft, wherein the shaft effects relative rotation of the sleeve and the locking pin by the force of the electric motor.

22 Claims, 5 Drawing Sheets

(51) Int. Cl.
*E21B 17/03* (2006.01)
*E21B 3/02* (2006.01)

(58) Field of Classification Search
CPC .. F15B 15/24; F16H 19/001; F16H 2019/008; F16L 25/065
See application file for complete search history.

(56) References Cited

U.S. PATENT DOCUMENTS

| | | | | |
|---|---|---|---|---|
| 6,616,133 | B1 * | 9/2003 | Wheeler | B25B 5/122 |
| | | | | 269/32 |
| 8,967,034 | B2 * | 3/2015 | Tunkers | B25B 5/122 |
| | | | | 269/32 |
| 9,903,166 | B2 * | 2/2018 | Miesen | E21B 17/046 |
| 2007/0277988 | A1 * | 12/2007 | Stoetzer | E21B 17/03 |
| | | | | 173/46 |
| 2010/0313613 | A1 * | 12/2010 | Fong | B60R 25/02 |
| | | | | 70/224 |
| 2014/0339781 | A1 | 11/2014 | Miesen | |
| 2016/0208580 | A1 * | 7/2016 | Delzell | E21B 33/12 |
| 2016/0305515 | A1 * | 10/2016 | Leffer | E21B 17/03 |
| 2017/0281196 | A1 * | 10/2017 | del Rio | A61B 17/1615 |

FOREIGN PATENT DOCUMENTS

| | | | | |
|---|---|---|---|---|
| DE | 4113847 | C1 * | 12/1992 | E21B 3/02 |
| DE | 29508441 | U1 | 8/1995 | |
| DE | 10040529 | A1 * | 5/2001 | E21B 19/06 |
| DE | 20301137 | U1 | 5/2003 | |
| DE | 102011108999 | A1 | 1/2013 | |
| EP | 1624151 | A2 * | 2/2006 | E21B 6/00 |
| EP | 1624151 | A2 | 2/2006 | |
| EP | 2503092 | A1 * | 9/2012 | E21B 3/04 |

OTHER PUBLICATIONS

International Search Report (and English translation) and Written Opinion dated Jun. 11, 2015 in International Application No. PCT/EP2014/003212.

* cited by examiner

LOCKING DEVICE AND LOCKING METHOD FOR THE TOOL HOLDER OF A DRILLING SYSTEM

CROSS-REFERENCE TO RELATED APPLICATIONS

This application is a Section 371 of International Application No. PCT/EP2014/003212, filed Dec. 3, 2014, which was published in the German language on Jun. 18, 2015, under International Publication No. WO 2015/086126 A3 and the disclosure of which is incorporated herein by reference.

BACKGROUND OF THE INVENTION

The invention relates to a locking device and a locking method for locking a tool to the tool holder of a rotary drilling rig.

Rotary drilling rigs are primarily used in civil engineering or in the search for mineral resources for the sinking of boreholes, in particular for producing cased boreholes.

When drilling holes, with many types of ground and many drilling methods (e.g. rotary drilling methods or oscillation drilling methods) the drilling tools need to be replaced frequently. In conventional drilling rigs the tool holder is located directly under a rotary drive for driving the drilling equipment. The drilling tools, particularly augers, drilling buckets or casings, are inserted into this tool holder, and locked after insertion. The rotary drive is often a top drive (KDK), which drives the push pipe or pipe string, and often both elements.

Particularly in the production of cased boreholes using rotary drilling rigs, a frequent tool change is needed, at least with respect to the casings, but also with regard to the excavating tools (for example, drilling augers or drilling buckets). When driving the casing, the soil and rock is first loosened with the excavation tool and removed, and, simultaneously or after fixed intervals, the casing is moved downwards in the hole by the push pipe. Depending on the ground conditions, a casing machine is used in addition.

For removing the excavated material from the borehole, it is necessary to disengage the casing from the push pipe, to pull out the Kelly bar along with the excavation tool, to deposit the excavated material next to the borehole, to insert the excavation tool back into the casing with the Kelly bar, and to lock the push pipe to the casing again.

Depending on the ground conditions, sometimes the excavating tool on the Kelly bar must also be replaced and locked.

If a new hole is dug and cased, the casing has to be lifted completely and transported to the borehole by the rotary drilling rig. In this process, casings and excavation tools are therefore temporarily guided freely suspended from the rotary drilling rig.

On being inserted, the drilling tools engage with an area of the tool holder, mostly with positive locking. For locking, locking pins are generally used, which are arranged in sleeves on the tool or the tool holder and which are displaced manually by a lever or by a hydraulic system, in order to engage in holes of the counterpart and thereby lock the latter.

A disadvantage of the prior art is that the known devices are comparatively complicated and thus expensive, and that their use is expensive, since the control lines and control elements must be guided through the rotary drive of the drilling rig into the rotating tool holder. In addition, integrated monitoring of the lock is very difficult or not possible at all, resulting in a deterioration of occupational safety.

European patent application publication EP 1 624 151 A2 describes an accommodation for a tubular drilling tool, which accommodation has a locking device comprising a radially arranged locking pin. The locking pin is rotatably and displaceably arranged in a sleeve. On the locking pin there is disposed a radially outwardly extending stud or guide pin that engages an elongated slot running helically in the sleeve. Through a rotary motion of the locking pin about its longitudinal axis the locking pin is displaced laterally, parallel to the longitudinal axis. The rotary motion of the pin relative to the sleeve is effected by a movement system, using an electric motor, for example. A position monitoring system for monitoring the position of the locking pin is not provided.

BRIEF SUMMARY OF THE INVENTION

The object of the invention is to overcome the disadvantages of the prior art and to make an optimized locking available.

This object is achieved by a locking device and a locking method according to the claims.

The inventive locking device for locking a tool to the tool holder of a rotary drilling rig includes a sleeve, a locking pin, a movement system, and a control system.

The shape of the sleeve and of the locking bolt is largely arbitrary. However, the parts must be designed so that the sleeve engages around the locking pin with positive locking, so that the locking pin can rotate about its longitudinal axis in the sleeve and can thereby be displaced laterally, parallel to the longitudinal axis.

The locking pin and the sleeve are designed such that the feed motion of the locking pin relative to the sleeve is achieved by its rotation in the sleeve. This is preferably done in that an element protrudes from the locking pin and is guided in a helical recess of the sleeve, or in that an element protrudes from the sleeve and is guided in a helical recess of the locking pin.

A suitable lateral movement of the locking pin relative to the sleeve is, in the case of the locking process, particularly designed so that the locking pin is moved from a position in which its front face is located within the sleeve or is at least flush with the sleeve or the tool holder into a position in which it protrudes from the sleeve to such an extent that it can engage with a recess in the tool (in particular through a recess in the tool holder), in particular over a distance of at least 1 cm.

Preferably, the locking pin comprises at least one radially outwardly extending guide pin, which is guided in a slide (Kulisse) in the sleeve, in particular in a slide which extends obliquely to the longitudinal direction of the sleeve, or helically, which slide is preferably a slot-like recess in the sleeve. The slide can be a recess extending through part of the wall thickness of the sleeve or through the entire wall thickness of the sleeve.

In a preferred embodiment, the slide allows rotation of a guide pin which is not greater than 360°, preferably not greater than 180°.

In a preferred embodiment, an end portion of the guide pin, which guide pin is guided in the slide, protrudes over the edge of the sleeve. This allows very easy control of the position of the guide pin, visually or by sensors.

The movement system includes at least one electric motor and at least one shaft by which it effects a relative rotation of the sleeve and the locking bolt by the force of the electric motor.

Preferably, the movement system includes at least one gear unit, in particular at least one angular gear. In the following, for the sake of clarity, only one electric motor and one gear unit will be mentioned; this is, however, not to be interpreted as limiting but is a preferred embodiment.

The gear unit is driven in this case by the rotational movement of the electric motor and effects the rotation of the shaft of the movement system. The shaft, in turn, causes the relative rotation of the sleeve and the locking pin. The advantage of an angular gear is that the locking device can be mounted on the tool holder in a space-saving manner.

Preferably, at least one of the shafts of the movement system is the shaft of an electric motor or the shaft of a gear unit.

In order to stop the rotation of the electric motor quickly and/or to prevent rotations in the idle state, the movement system preferably comprises at least one brake.

In the braked state, such a brake prevents rotation of the shaft of the movement system by blocking the shaft directly, the electric motor, the gear unit, and/or a relative rotation of locking pin and sleeve.

In a preferred embodiment, the movement system is firmly connected to the sleeve, preferably by an adapter, so that rotation of the shaft causes rotation of the locking pin in the sleeve, while the movement system remains rigidly aligned with the sleeve. As already stated above, rotation of the locking pin causes it to be laterally displaced in the sleeve. By displacement, the pin can engage in holes of the tool or of the tool holder and thus exert its locking function.

In another preferred embodiment, the movement system is firmly connected to the locking pin, preferably by an adapter, so that rotation of the shaft causes rotation of the sleeve about the locking pin, while the movement system always remains rigidly aligned with the locking pin.

To compensate for the lateral movement of the locking pin relative to the movement system, the locking device preferably comprises additional elements for compensating this displacement relative to the shaft of the movement system, particularly a sliding shaft which transfers the rotation of the shaft to the locking bolt but can be displaced rotatingly relative to the shaft.

The control system includes units for controlling the movement system, so that, in particular through an external drive signal, the movement system moves the locking pin into a locking or non-locking position. Drive signals can be transmitted by a wired or radio-based transmission to the control system which, if necessary, includes units for receiving radio signals and/or units for decoding data signals. A remote control is preferable because in this case there is no need for cables leading from the operator's cabin of the drilling rig to the locking device for data transmission. Drive signals can also be sent by an additional sensor unit, which automatically detects that a tool has been mounted or dropped and which automatically controls the control system without operation by a person.

Since the tool holder moves, it is of great advantage if, at the interface with the moving parts of the machine, the signals on the wires are transmitted by sliding contacts.

In a preferred embodiment, the locking device, in particular the control system, includes an energy storage device, particularly batteries or accumulators, which provides enough energy for at least one unlocking and/or locking operation. This has the advantage that no supply lines for energy leading from the power supply of the rotary drilling rig to the locking device need to be provided.

In a further preferred embodiment, the locking device comprises a system by which energy can be won from the rotation of the tool holder relative to non-moving parts of the drilling rig. Preferably, the system has at least one dynamo for energy recovery, the stator of which is preferably arranged at the tool holder and whose rotator is guided along non-moving parts of the drilling rig during the rotation of the tool holder and can thus rotate relative to the stator.

This embodiment is particularly effective if it includes the aforementioned energy storage device, in which energy can be stored during drilling. In this way, during a drilling process, sufficient energy can be accumulated for unlocking and locking in the next tool change.

In a preferred embodiment, the locking device comprises a position monitoring system which preferably comprises at least one sensor or at least one pair of sensors.

This position monitoring system is adapted to monitor the position of the locking pin, in particular its end position in the locked and/or unlocked state. Preferred sensors are those selected from the group comprising photoelectric barriers, electric switches, particularly proximity switches, electromechanical switches, particularly tracers, potentiometers and electrical contact surfaces.

When measuring the position of the locking pin, its position is preferably determined directly or indirectly. This can be done in particular by measuring the position of the locking pin relative to the sleeve, by measuring the position of the guide pin, or by measuring the rotation of a shaft of the movement system, for example by a potentiometer.

When measuring the position of the locking pin or the position of the guide pin, the use of tracers and/or proximity switches in the position monitoring system is preferred.

The position monitoring system is preferably used to control the movement system; for example, such that the movement system remains in motion until an end position is reached, and/or an alarm system is actuated when the tool or the tool holder is moved without locking having been effected. The abovementioned alarm system is, in particular, an additional component part of the locking device.

With the position monitoring system it is possible for the locking device according to the invention to make a significant contribution to occupational safety. In practice, successful locking is sometimes checked only visually, which can lead to human errors. Also, in order to save time, locking is sometimes dispensed with entirely and the positive locking between the tool and tool holder is utilized, together with the pressure occurring in the drilling process. However, since the tools (rotary pipes or casings and excavation tools) are often moved freely suspended in rotary drilling processes, accidents may occur due to tools falling down if the tools are not properly locked.

The present invention comprising a position monitoring system can reliably accomplish detection and indication of proper locking.

To this end, the locking device preferably includes indicating elements and/or alarm elements. It is also preferred that in the case of improper locking a signal is transmitted to the drilling rig (via radio or wired) which prevents movement of the tool until proper locking is effected.

In a preferred embodiment, the tool holder is the push pipe of a rotary drilling rig, which is particularly adapted to accommodate casings. Preferably, at least two, in particular three, four or five, locking devices according to the invention are mounted on the push pipe.

In the aforementioned case, a locking device according to the invention is preferably mounted so that its locking pin can lock a tool, particularly a casing, through the jacket wall of the push pipe. This is realized, in particular, in that recesses are present in the jacket wall at the corresponding positions, or in that the device forms part of the jacket wall. As a rule, the places where the locking pins are arranged are at the lower end portion of the jacket wall of a fitted push pipe.

In this embodiment, the locking device according to the invention is therefore specifically designed for the locking of tools, especially casings, to a pressure tube.

In another preferred embodiment, which may well be combined with the above-described embodiment, the tool holder is attached at the end portion of the Kelly bar of a rotary drilling rig, or it forms the end portion. Tools designed for this purpose are, in particular, excavation tools, preferably augers or drilling buckets. In this embodiment, the locking device according to the present invention is thus specifically adapted for the locking of tools, especially excavation tools such as augers or drilling buckets, to a Kelly bar.

In a preferred embodiment, the locking pins and/or the sleeve are commercial elements which have been equipped with the other elements of the device according to the invention and thus form the locking device of the invention.

An inventive locking procedure for locking of a tool to a tool holder of a rotary drilling rig comprising at least one locking device is based on the steps of:

connecting the tool to the tool holder;
turning at least one locking pin relative to the sleeve associated with the locking pin, by at least one electric motor.

The locking pin will thereby protrude from the sleeve and clamp the tool to the tool holder, or engage with holes in the tool and/or in the tool holder, thus locking the two parts together.

Although for the sake of clarity important component parts of the invention are mentioned in the singular, this does not exclude that all these mentioned parts may also occur several times in the device. For example, several electric motors may act on a single gear unit, or several gear units may be driven by a single electric motor. Also, a locking pin may comprise a plurality of guide pins, or sleeves may comprise several slides.

Examples of preferred embodiments of the locking device are shown in the figures.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
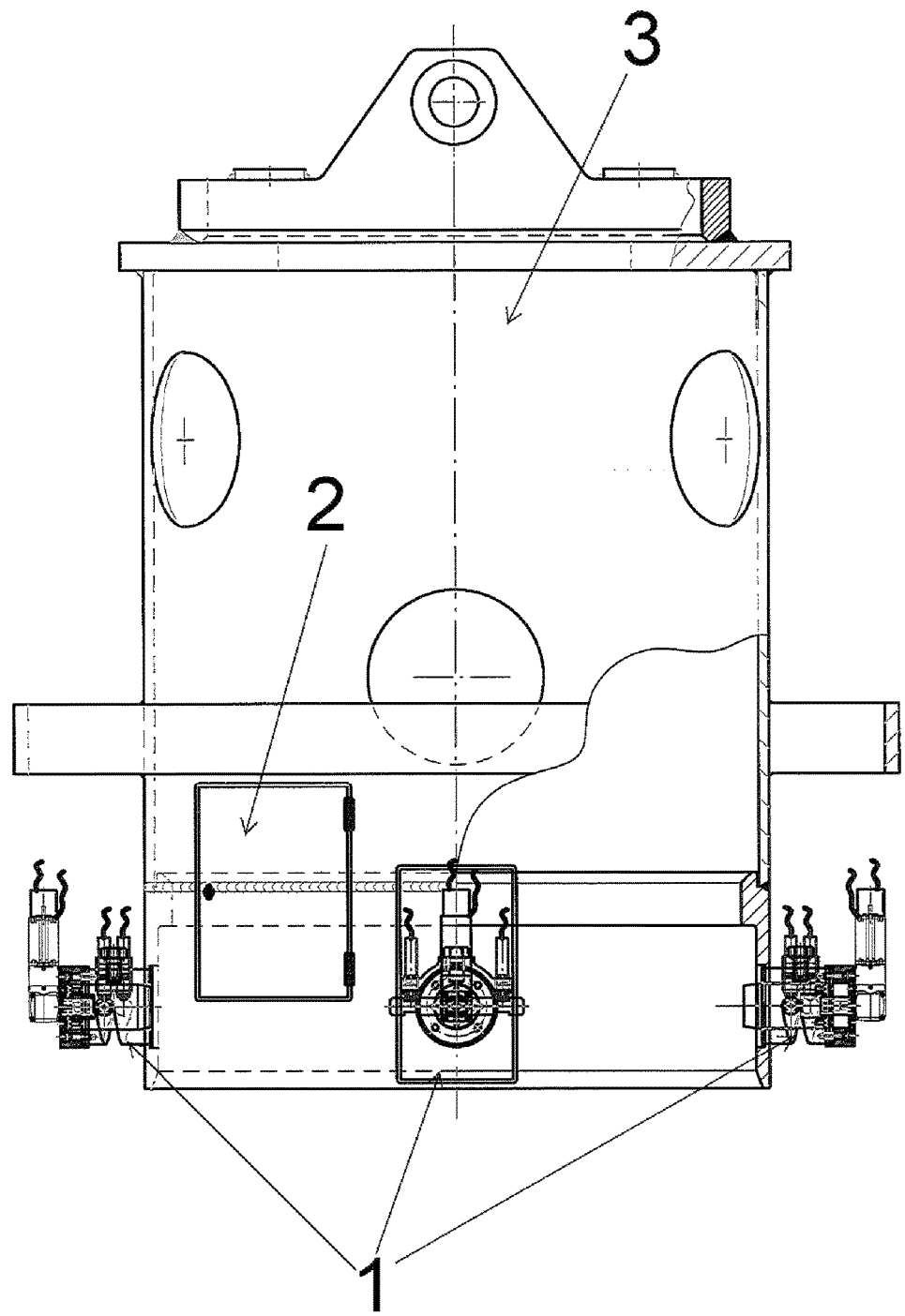
FIG. 1 is a schematic sectional view showing the position of locking devices of preferred embodiments according to the invention on a tool holder.

In FIG. 1 the positions of three locking devices 1 in a tool holder 3 of a rotary drilling rig are shown. The tool holder 3 can be, for example, the automatic push pipe of a mobile rotary drilling rig. At the upper end of the tool holder 3, a rotary device of the drilling rig may be installed, for example. The lower end of the tool holder 3 is adapted to be connected to tools, which are not shown. For example, casings used for drilling of piles or for making cased bore holes can be inserted in the tool holder 3 and locked by the locking devices 1. Tools are locked by the locking pins reaching through through-holes in the casing, thereby securing the tool.

By a control system 2, the locking and unlocking of the respective tool can be controlled. In the event that the control system comprises a radio receiver and its own energy source, such as an accumulator, it would not be necessary to route cables from the outside to the rotating tool holder, which has the advantage that the system is inexpensive, easy to install and easy to maintain.

Figure 2:
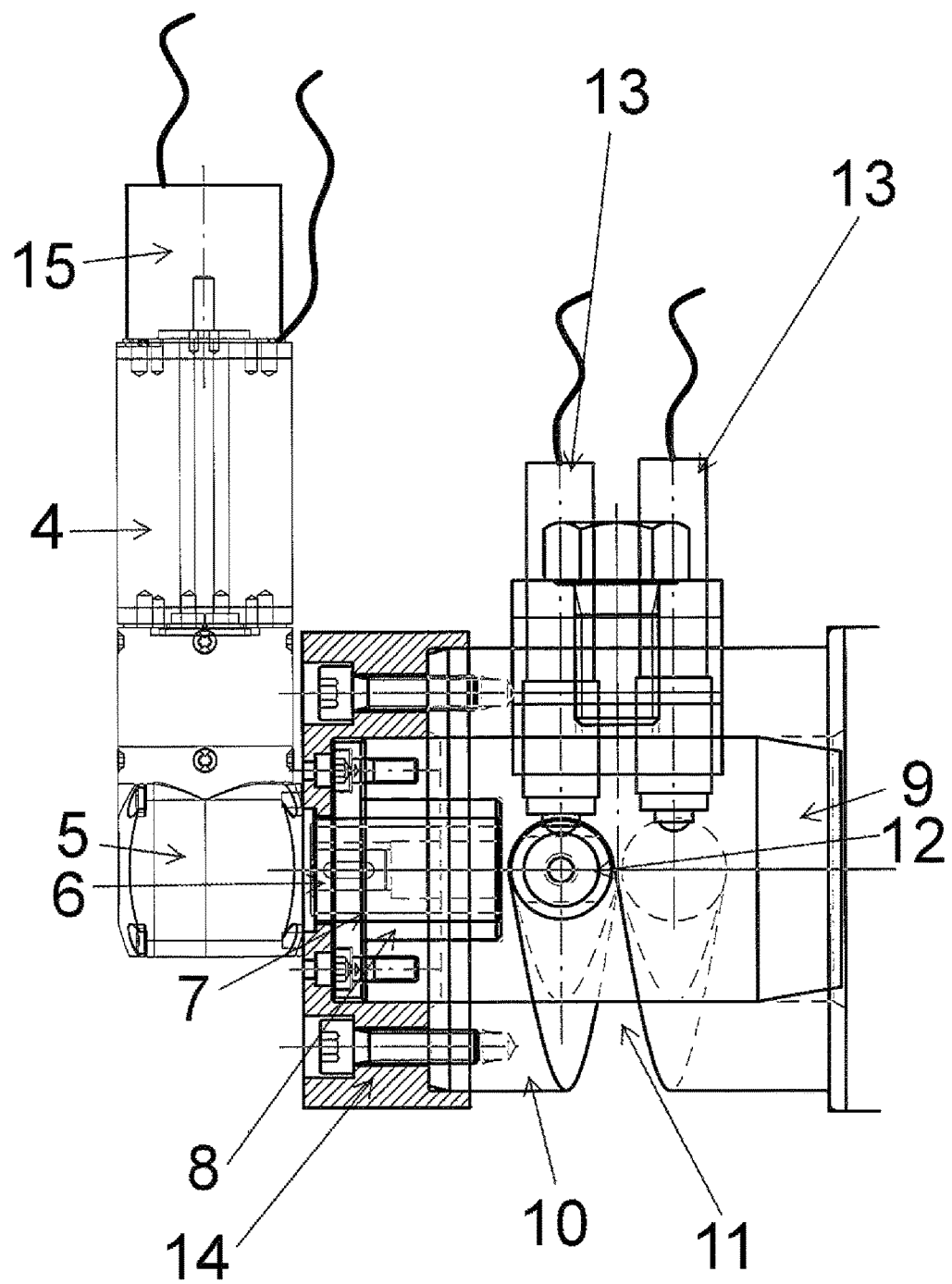
FIG. 2 is a schematic lateral sectional view showing a preferred embodiment of a locking device according to the invention in the unlocked state.
Figure 3:
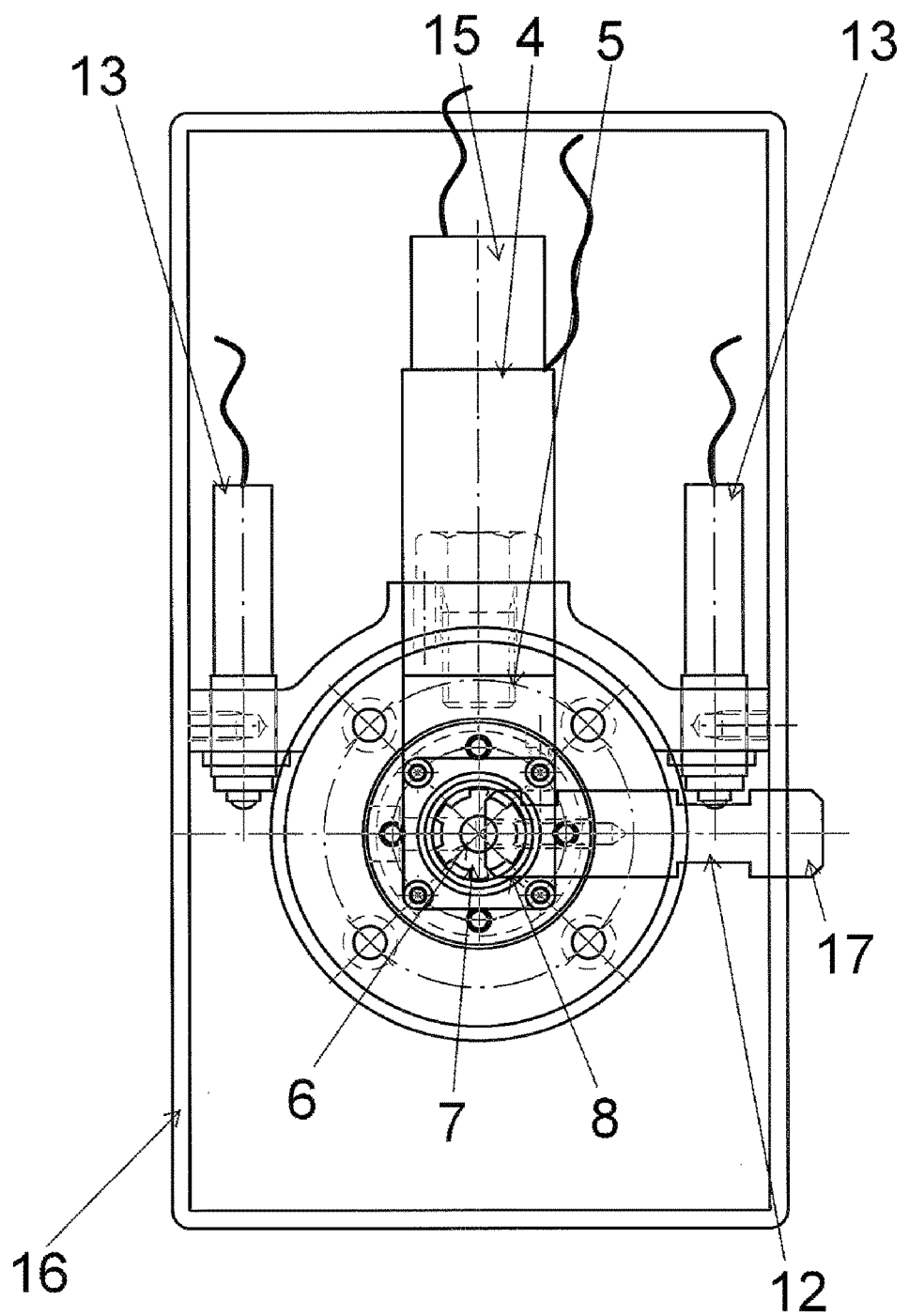
FIG. 3 is a schematic rear sectional view showing a preferred embodiment of a locking device according to the invention in the unlocked state.

In FIGS. 2 and 3, a preferred embodiment in the unlocked state is shown laterally and from the rear. It can be clearly seen how an electric motor 4 causes the locking pin 9 to rotate in a sleeve 10, via a gear unit 5, which here is an angular gear. The locking pin 9 is supported slidably and rotatably in the sleeve 10 and has a radially outwardly extending guide pin 12, with the guide pin 12 being guided in a slot-like recess of the sleeve, which runs obliquely to the longitudinal direction of the sleeve.

The rotation of the electric motor 4 is transmitted via the gear unit 5 to the gear shaft 6, which in turn transmits its rotation to a sliding shaft 7. The sliding shaft 7 is connected to the locking pin 9 and compensates for the lateral movement of the locking pin 9 relative to the gear shaft 6. In order to optimize the movement of the locking pin 9, it may be guided by an additional axial guide 8.

The rotation of the locking pin 9 causes the guide pin 12 thereof to be helically guided in the slot-like slide guide 11 of the sleeve 10. This helical movement pushes the locking pin 9 out of the sleeve 10 (in the drawing, to the right), so that after completing this movement it protrudes from the sleeve and would thereby lock a tool to the tool holder.

Two elements for position monitoring, the sensors 13, monitor the position of the locking pin 9 through the position of the guide pin 12. In the unlocked state shown, the guide pin is aligned so that the sensor 13, which monitors the unlocked position (left-hand sensor in FIG. 2, right-hand sensor in FIG. 3) is triggered. In the event that the locking device is located in a housing 16 for protection thereof as shown in FIG. 3, a guide pin extension 17 is helpful which enables the guide pin to project at least at its end position from the housing and permits additional visual inspection. The locking device can be connected via an adapter 14 to the sleeve or to the tool holder. A brake 15 allows blocking of the locking device, so that no manual or automatic adjustment is possible.

Figure 4:
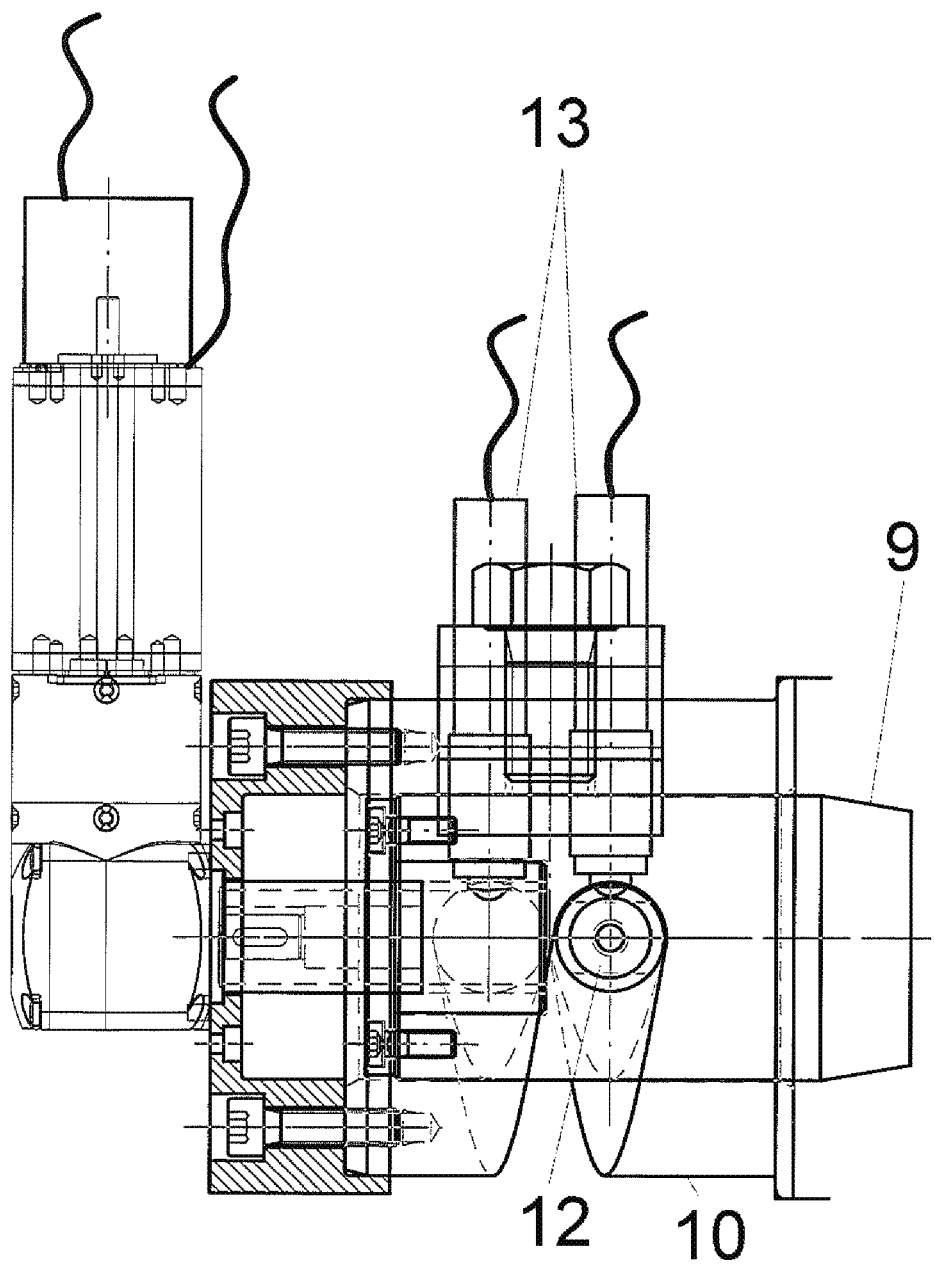
FIG. 4 is a schematic lateral sectional view showing a preferred embodiment of a locking device according to the invention in the locked state.
Figure 5:
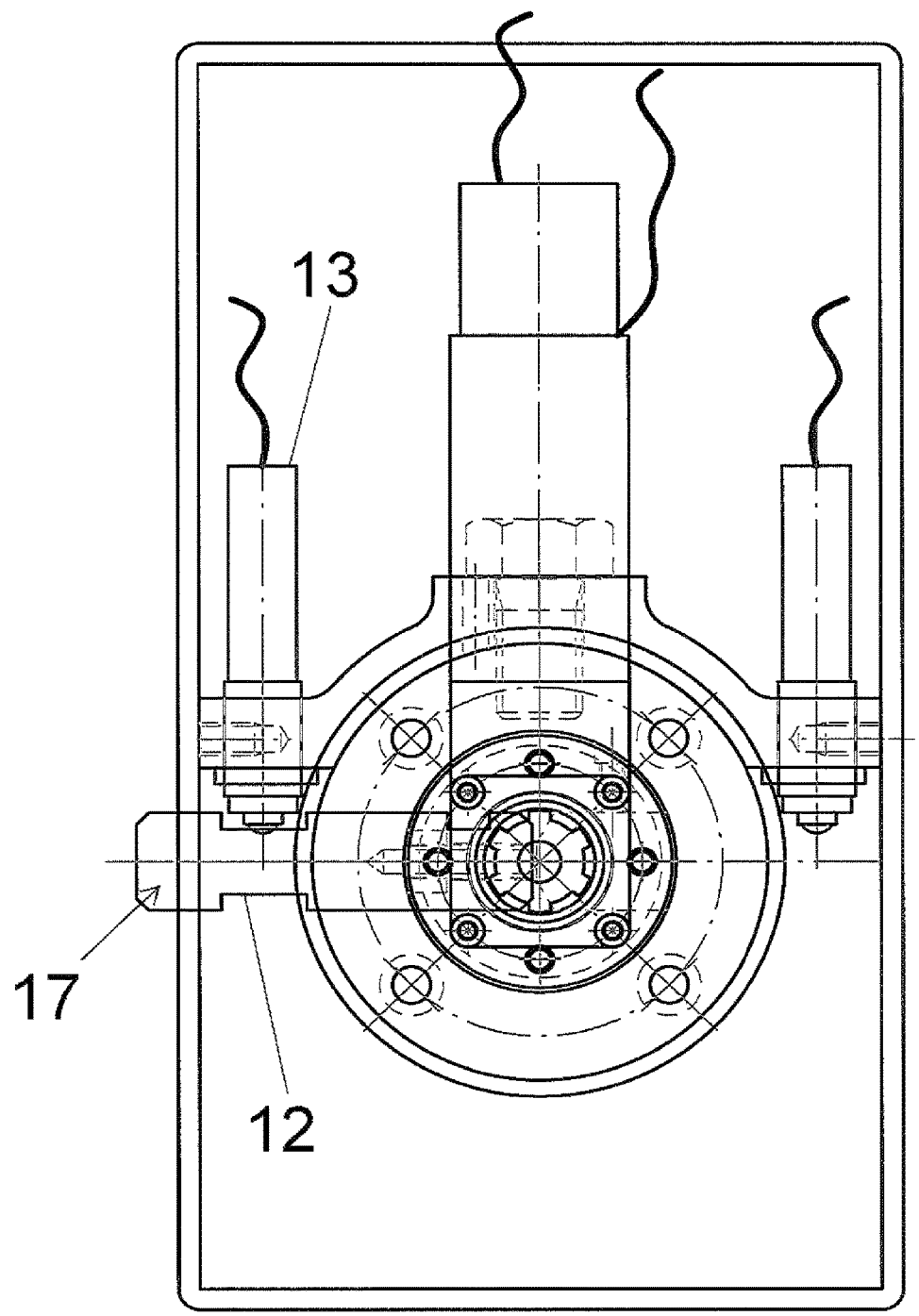
FIG. 5 is a schematic rear sectional view show a preferred embodiment of a locking device according to the invention in the locked state.

FIGS. 4 and 5 show a preferred embodiment in the locked state, laterally and from the rear. Compared to FIGS. 2 and 3 the locking pin 9 is now in the extended state (locking state). In the locked state shown, the guide pin is aligned such that the sensor 13, which monitors the locked position (right sensor in FIG. 2, left sensor in FIG. 3), is triggered.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A locking device (1) for locking a tool to a tool holder (3) of a rotary drilling rig, the locking device comprising a sleeve (10), a locking pin (9), a movement system, and a control system (2), the sleeve (10) and the locking pin (9) being configured such that the sleeve (10) engages around the locking pin (9) with positive locking such that the locking pin (9) can rotate in the sleeve (10) about a longitudinal axis of the locking pin (9) and can be displaced laterally parallel to the longitudinal axis, the locking pin (9) comprising at least one radially outwardly extending guide pin (12) which is guided in a slide in the sleeve (10), and the movement system having at least one electric motor (4) and at least one shaft, wherein the at least one shaft effects a relative rotation of sleeve (10) and locking pin (9) by force of the at least one electric motor (4), the locking device (1) further comprising a position monitoring system designed to monitor a position of the locking pin (9), the position monitoring system comprising at least one sensor or at least one pair of sensors (13) for measuring a position of the guide pin (12), and the position monitoring system being designed such that the position of the locking pin (9) is determined indirectly by measuring the position of the guide pin (12) via the at least one sensor or at least one pair of sensors (13).

2. The locking device (1) according to claim 1, wherein the guide pin (12) is guided in a slot-shaped recess of the sleeve (10), the slot-shaped recess extending obliquely or helically to a longitudinal direction of the sleeve (10), and the slide designed such that it allows a rotation of the guide pin (12) not greater than 360°.

3. The locking device (1) according to claim 2, wherein the allowed rotation of the guide pin (12) is not greater than 180°.

4. The locking device (1) according to claim 1, wherein the movement system has at least one gear unit (5), and wherein the at least one gear unit (5) is driven by rotary movement of the at least one electric motor (4) and causes rotation of the at least one shaft.

5. The locking device (1) according to claim 4, wherein the at least one gear unit (5) comprises at least one angular gear.

6. The locking device (1) according to claim 1, wherein the movement system comprises at least one brake (15) for preventing rotation of the at least one shaft.

7. The locking device (1) according to claim 6, wherein the at least one brake (15) acts on the at least shaft directly, on the at least one electric motor (4), on the at least one gear unit (5), and/or on a relative rotation of the locking pin (9) and the sleeve (10).

8. The locking device (1) according to claim 1, wherein the movement system is firmly connected to the sleeve (10), so that rotation of the at least one shaft causes rotation of the locking pin (9) in the sleeve (10), while the movement system remains rigidly aligned with the sleeve (10).

9. The locking device (1) according to claim 8, wherein the movement system is firmly connected to the sleeve (10) by an adapter (14).

10. The locking device (1) according to claim 1, wherein the control system (2) comprises units for controlling the movement system, such that the movement system moves the locking pin (9) into a locking or non-locking position.

11. The locking device (1) according to claim 10, wherein the units for controlling the movement system act by an external drive signal.

12. The locking device (1) according to claim 1, further comprising an energy storage device which supplies enough energy for at least one unlocking and/or locking operation.

13. The locking device (1) according to claim 12, further comprising a system that allows for energy to be won from rotation of the tool holder (3) relative to non-moving parts of the drilling rig.

14. The locking device (1) according to claim 1, wherein an end portion of the guide pin (12) is guided in the slide and protrudes over an edge of the sleeve (10).

15. The locking device (1) according to claim 1, wherein the at least one sensor is configured to indirectly monitor an end position of the locking pin (9) in the locked and/or unlocked state.

16. A locking method for locking a tool to a tool holder of a rotary drilling rig, the method comprising steps of:
    connecting the tool to the tool holder with at least one locking device according to claim 1; and
    turning the locking pin of the at least one locking device relative to the sleeve associated with the locking pin by the at least one electric motor.

17. The method according to claim 16, wherein the position monitoring system is used to control the movement system, such that the movement system remains in motion until a final position is reached.

18. The method according to claim 16, wherein an alarm system is actuated when the tool or the tool holder moves without a locking having been effected.

19. The locking device (1) according to claim 1, wherein the at least one sensor or at least one pair of sensors comprises at least one of a photoelectric barrier, an electric switch, an electromechanical switch, a potentiometer and an electrical contact surface.

20. A locking device (1) for locking a tool to a tool holder (3) of a rotary drilling rig, the locking device comprising a sleeve (10), a locking pin (9), a movement system, and a control system (2), the sleeve (10) and the locking pin (9) being configured such that the sleeve (10) engages around the locking pin (9) with positive locking such that the locking pin (9) can rotate in the sleeve (10) about a longitudinal axis of the locking pin (9) and can be displaced laterally parallel to the longitudinal axis, the locking pin (9) comprising at least one radially outwardly extending guide pin (12) which is guided in a slide in the sleeve (10), and the movement system having at least one electric motor (4) and at least one shaft, wherein the movement system comprises at least one brake (15) for breaking the at least one shaft, and wherein the at least one shaft effects a relative rotation of sleeve (10) and locking pin (9) by force of the at least one electric motor (4), the locking device (1) further comprising a position monitoring system designed to monitor a position of the locking pin (9), and the locking device (1) being designed such that when measuring the position of the locking pin (9), the position of the locking pin (9) is determined by measuring a position of the guide pin (12).

21. A locking device (1) for locking a tool to a tool holder (3) of a rotary drilling rig, the locking device comprising a sleeve (10), a locking pin (9), a movement system, and a control system (2), the sleeve (10) and the locking pin (9) being configured such that the sleeve (10) engages around the locking pin (9) with positive locking such that the locking pin (9) can rotate in the sleeve (10) about a longitudinal axis of the locking pin (9) and can be displaced laterally parallel to the longitudinal axis, the locking pin (9) comprising at least one radially outwardly extending guide pin (12) which is guided in a slide in the sleeve (10), and the movement system having at least one electric motor (4) and at least one shaft, wherein the at least one shaft effects a relative rotation of sleeve (10) and locking pin (9) by force of the at least one electric motor (4), and wherein the movement system is firmly connected to the sleeve (10), so that rotation of the at least one shaft causes rotation of the locking pin (9) in the sleeve (10), while the movement system remains rigidly aligned with the sleeve (10), the locking device (1) further comprising a position monitoring system designed to monitor a position of the locking pin (9), and the locking device (1) being designed such that when measuring the position of the locking pin (9), the position of the locking pin (9) is determined by measuring a position of the guide pin (12).

22. A locking device (1) for locking a tool to a tool holder (3) of a rotary drilling rig, the locking device comprising a sleeve (10), a locking pin (9), a movement system, and a control system (2), the sleeve (10) and the locking pin (9) being configured such that the sleeve (10) engages around the locking pin (9) with positive locking such that the locking pin (9) can rotate in the sleeve (10) about a longitudinal axis of the locking pin (9) and can be displaced laterally parallel to the longitudinal axis, the locking pin (9) comprising at least one radially outwardly extending guide pin (12) which is guided in a slide in the sleeve (10), and the movement system having at least one electric motor (4) and at least one shaft, wherein the at least one shaft effects a relative rotation of sleeve (10) and locking pin (9) by force of the at least one electric motor (4), the locking device (1) further comprising a position monitoring system designed to monitor a position of the locking pin (9), and the locking device (1) being designed such that when measuring the position of the locking pin (9), the position of the locking pin (9) is determined by measuring a position of the guide pin (12), and wherein the locking device further comprises a system that allows for energy to be won from rotation of the tool holder (3) relative to non-moving parts of the drilling rig.

* * * * *